Aug. 2, 1955  C. L. COOK  2,714,460
LIFT FORK FOR TRACTOR
Filed Oct. 1, 1951

INVENTOR:
CURTISS L. COOK
BY
Roger C. Johnson
ATTORNEY

United States Patent Office 2,714,460
Patented Aug. 2, 1955

2,714,460

LIFT FORK FOR TRACTOR

Curtiss L. Cook, Syracuse, N. Y., assignor, by mesne assignments, to Deere & Company, Moline, Ill., a corporation of Illinois Application October 1, 1951, Serial No. 249,115

8 Claims. (Cl. 214—140)

The present invention relates generally to agricultural implements and more particularly to attachments for farm tractors whereby the latter may be used to raise and transport articles, containers, tote boxes, skid platforms and the like about the farm.

The object and general nature of the present invention is the provision of a carrier attachable to the rearwardly extending, power lift actuated links, with which certain tractors in common use today are equipped, the connecting means between the carrier and the power lift actuated linkage being such that the first movement of the parts in the raising direction serves to tilt the carrier, and any load or loads thereon, before starting to raise the same off the ground, whereby the stability of the outfit, when transporting loads and the like from one position to another, is materially improved.

A further feature of the present invention is the provision of a carrier of the type just mentioned, so constructed and arranged with a pin and slot type of lost motion means whereby the first movement of the power lift actuated linkage acts to shift the position of the carrier before lifting the same off the ground.

Figure 1:
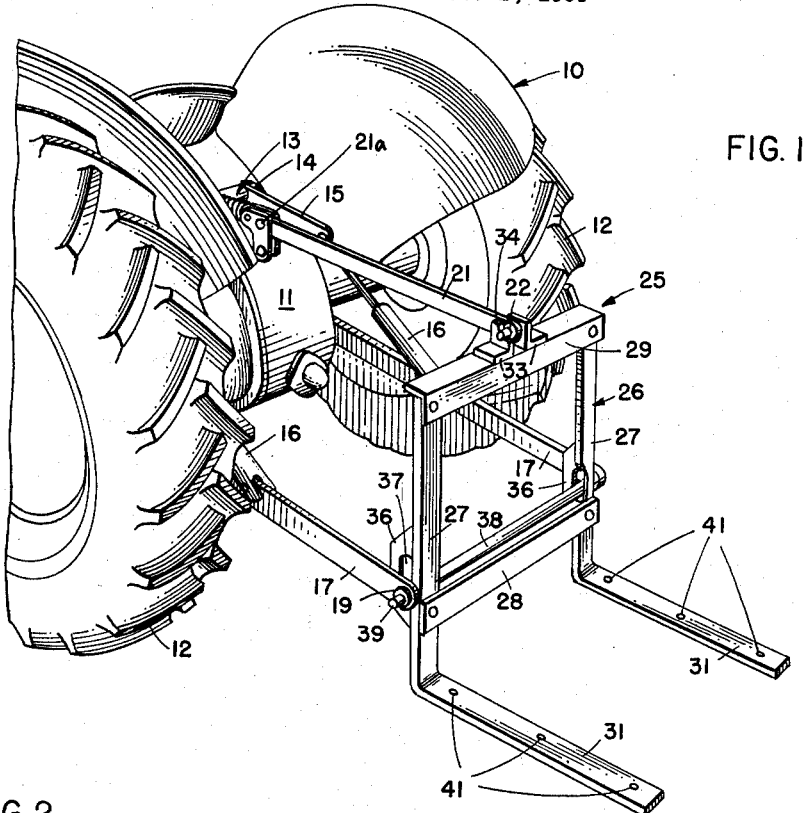

These and other objects and advantages of the present invention will be apparent to those skilled in the art after a consideration of the following detailed description, taken in conjunction with the accompanying drawings, in which:

Figure 1 is a fragmentary perspective view showing the carrier of the present invention connected with a conventional farm tractor, the carrier being disposed in its lowermost position.

Figure 2:
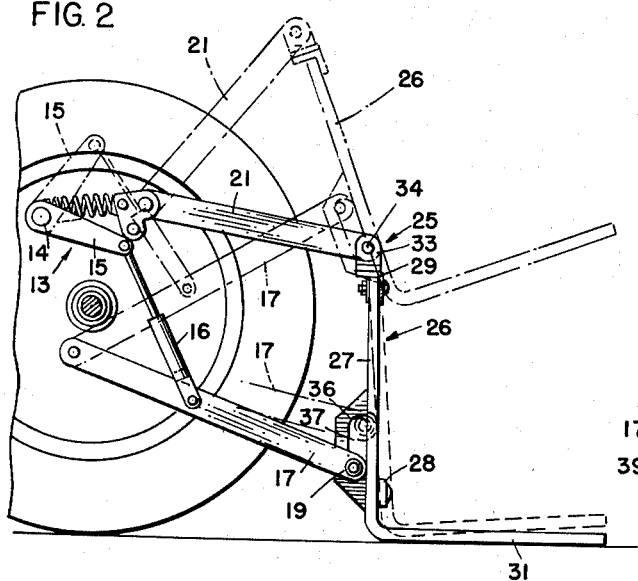

Figure 2 is an enlarged fragmentary side view showing, in full lines, the carrier and linkage parts in the positions they occupy when the carrier, and any load thereon, is resting on the ground, the position of the carrier when tilted but before the carrier and load have been raised being shown in dotted lines, Figure 2 in dash and dot lines showing the position of the carrier in its maximum raised position.

Figure 3:
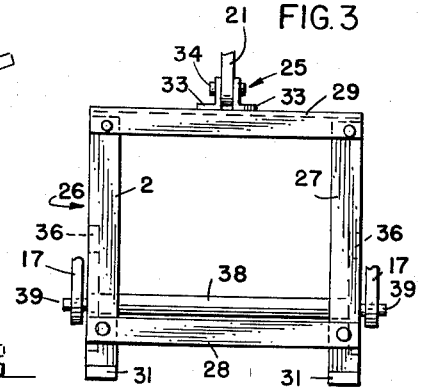

Figure 3 is a rear view, looking forwardly toward the carrier detached from the tractor.

Referring now to the drawings, particularly Figure 1, the reference numeral 10 indicates a conventional farm tractor having a rear axle structure 11 carrying rear traction wheels 12, the tractor being equipped with a power lift unit 13 which includes a rockshaft 14 to the ends of which a pair of lift arms 15 are fixed. By means of lift links 16, one or both of which may be adjustable in length, the lift arms 15 are connected with a pair of lower laterally spaced apart, generally rearwardly extending attachment members in the form of draft levers 17, the forward ends of which are connected to ball and socket means with the rear axle 11 of the tractor, for generally vertical swinging movement relative to the latter. The rear ends of the draft levers 17 are provided with apertured ball means 19 to which various implements may be connected, as desired. Also, the tractor 10 is equipped with an upper attachment member in the form of a compression link 21, the forward end of which is connected, as at 21a, for universal pivotal movement with the upper portion of the tractor rear axle 11, and the rear end of the upper compression link 21 also having apertured ball means 22 to which implements may be connected, as desired.

The carrier, with which the present invention is more particularly concerned, is indicated in its entirety by the reference numeral 25 and comprises frame means including an upright carrier member 26, made up of a pair of vertical bars 27 connected together adjacent their lower portions by a crossbar 28 and at their upper ends by an upper angle member 29. The lower rear end portions of the upright bars 27 are bent so as to extend rearwardly, as at 31, to provide a pair of article-engaging or load-engaging arms 31. A pair of angle brackets 33 are fixed to the central portion of the upper crossbar 29 and are apertured to receive a pin 34 or the like whereby the rear end of the upper or compression link 21 may be connected to the carrier 25.

A generally U-shaped bracket 36 is fixed to the lower portion of each of the bars 27, preferably being welded thereto at the forward side thereof, and each bracket is provided with a vertically extending slot 37 in which a part in the form of a cross bar or member 38 is loosely disposed. The laterally outer ends of the cross member 38 are reduced, as at 39, the reduced ends being respectively engageable in the apertured ball connectors 19 at the rear ends of the lower draft levers 17 of the tractor, and the diameter of the cross member 38 is such that, laterally inwardly of the reduced ends 39, the adjacent end portions of the member 38 substantially fill the associated slots 37, the end portions of the member 38 bearing against the flat forward faces of the vertical carrier bars 27.

The brackets 36 and the cross shaft or bar 38 constitute one form of lost motion means connecting the rear ends of the levers 17 with the carrier frame 26 providing for a limited amount of movement of the levers 17 relative to the carrier before further movement of the levers raises the carrier. The cross bar 38 and the immediate portions of the frame 26 that are engaged by the bar 38 constitute means responsive to upward movement of the levers 17 during their lost motion range for tilting the carrier from its full line position (Figure 2) to its dotted line position. This tilting action takes place before the carrier is raised.

The operation of the carrier of the present invention is substantially as follows:

The carrier may readily be connected to the tractor 10 merely by backing the same into position so that the upper link 21 and lower levers 17 may be readily connected to the brackets 33 and the shaft ends 39. In the lowermost position of the tractor power lift unit, including the draft levers 17, the latter extend rearwardly and downwardly relative to the tractor while the slotted portions 37, receiving the end portions of the carrier member 38, extend substantially directly upwardly. Therefore, when the power lift unit 13 of the tractor is operated to raise the draft levers 17, the initial movement of the latter merely raises the member 38 in th vertical slots 37 but does not raise the carrier as a whole. As a result, this first upward movement of the levers 17 causes the carrier 25 to be tilted in a generally fore-and-aft direction, the rear ends of the fork arms 31 being raised while the carrier 25 itself remains in contact with the ground. However, after the member 38 has been lifted to the upper ends of the slots 37, further upward movement of the levers 17 serves to raise the carrier 25 and any load or articles supported thereon. The advantage of first tilting the carrier 25 is that the load or articles thereon are shifted forwardly a relatively slight amount but sufficient to insure that during transport from one place to the other the load or articles will not fall off the rear of the carrier, even though the tractor should be driven over rough terrain, up inclines or the like.

The carrier arms 31 are apertured at a number of points, as at 41, to provide for fastening planks or the like firmly to the carrier arms 31, thereby providing, when desired, a stable platform upon which articles may be placed so as to be transported by the tractor from one place to another. Without the planks or the like, the fork arms 31 may be used with conventional skid platforms or similar devices whereby, with associated containers, articles, material and the like usable about the farm, may be readily transported from one place to another, as desired.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A carrier attachable to a tractor having a power lift unit, a pair of laterally spaced apart lower levers swingably connected with the tractor and actuated by said power lift unit, and upper link means connected with the tractor above said lower levers, said lower levers being movable relative to said upper link means, said carrier comprising a carrier member having an upright portion, means for connecting the upper part of said upright portion to the rear end of said upper link means, a cross member having end portions spaced to detachably receive the rear ends, respectively, of said lower levers, whereby raising and lowering movement of said lower levers when said power lift unit is operated serves to raise and lower said cross member, and vertically extending slot means carried by said carrier in a position to receive said cross member and extending generally vertically at such an angle that when said lower levers are raised to shift said cross member from its lower position to its upper position in said slot means, said carrier member is tilted.

2. A carrier as defined in claim 1, further characterized by a pair of rearwardly extending, laterally spaced apart article-engaging arms extending rearwardly from the lowermost end of said upright portion, said slot means lying at such angle, relative to said lower levers, that initial upward movement of said lower levers from their lowermost position serves to tilt said carrier member and raise the rear ends of said arms in a generally vertical direction relative to the forward portions thereof before the carrier member is raised.

3. A carrier attachable to a tractor having a power lift unit, an upper link, and a pair of lower lift levers, the latter being connected with said power lift unit to be operated thereby, said carrier comprising a carrier member having an upright portion, means for connecting the upper part of said upright portion to the rear end of the upper link, means for connecting the lower part of said upright portion to the rear ends of the lower levers, said last-mentioned connecting means including lost-motion means, said lost-motion means including a part adapted to be carried by said levers and means connected with said carrier member and receiving said last mentioned part and providing for a limited amount of generally vertical movement of said last mentioned part relative to said carrier member, the path of movement of said part during said permissive movement having a rearward component, means on the carrier lying generally rearwardly of and in contact with said part, whereby movement of said part through said path acts to swing the lower rear portion of said carrier rearwardly and upwardly, and means limiting the permissive movement of said part relative to said carrier member, whereby after said power lift unit is operated to raise said rear ends of said levers through said permissive amount, further raising of said levers raises said carrier relative to the tractor.

4. A carrier adapted to be attached to a tractor having a power lift, a pair of upper and lower members pivotally connected with the tractor for generally vertical swinging and extending generally rearwardly, one of said members being operatively connected with the tractor and constituting a lever, said carrier comprising a generally upright frame means having a generally rearwardly extending supporting section, means on said frame means to receive the rear end of said power operated lever and providing a lost-motion connection between said lever and said frame means accommodating a limited amount of generally vertical movement of said lever relative to said frame means, and means connected with said frame means and actuated by movement of said lever through said limited amount for tilting said frame means before raising the latter, said lost motion means including stop means operative after the lever has been moved through said limited amount of movement to raise said carrier frame means.

5. A carrier adapted to be attached to a tractor having a power lift, a pair of lifting levers operatively connected with the power lift and swingable generally vertically relative to the tractor by the operation of the power lift, and a link swingably connected at its forward end with the tractor for generally vertical movement and spaced generally vertically from said levers, said carrier comprising a generally upright frame means having a generally rearwardly extending supporting section, means on said frame means to receive the rear ends of said power operated levers and providing a lost-motion connection between the lift levers and said frame means accommodating a limited amount of generally vertical movement of said levers relative to said frame means, means on the upper portion of said upright frame means to pivotally receive the rear end portion of said link, and means connected with said frame means and actuated by movement of said levers through said limited amount for tilting said frame means before raising the latter, said lost-motion means including stop means operative after the levers have been moved through said limited amount of movement to raise said carrier frame means.

6. A carrier adapted to be attached to a tractor having three attachment members pivotally connected with the tractor for generally vertical swinging and in generally vertically spaced apart relation, and a power lift operatively connected with the lower of said members, said carrier comprising an upright frame means having supporting means connected therewith, means connected with the upper part of said upright frame means to pivotally receive the upper of said attachment members, a motion-transmitting part adapted to be connected to the lower of said attachment members, means movably connecting said part with said upright frame at such points thereon that when the carrier rests on the ground the lower of said attachment members extend generally downwardly and rearwardly whereby when said lower members are swung upwardly said part acts against the lower portion of said carrier to swing the supporting means thereof generally upwardly and rearwardly, and stop means limiting the movement of said part relative to said upright frame, whereby further upward swinging of said lower attachment member serves to raise said carrier.

7. The invention set forth in claim 6, further characterized by said motion-transmitting part comprising a crossbar attachable to the lower of said attachment members, and said part-connecting means comprising a vertically slotted bracket attached to said upright frame, said crossbar being disposed in the slot in said bracket.

8. The invention set forth in claim 6, further characterized by said upright frame means comprising a pair of laterally spaced apart bars having upright portions, said part-connecting means comprising a pair of vertically slotted brackets, one fixed to each upright frame portion, and said motion-transmitting part comprising a crossbar movable generally vertically in the slots of said brackets.

References Cited in the file of this patent

UNITED STATES PATENTS

| | | |
|---|---|---|
| 2,311,671 | Larsen | Feb. 23, 1943 |
| 2,379,797 | Gilbert | July 3, 1945 |
| 2,449,212 | Fraga | Sept. 14, 1948 |
| 2,505,639 | Eaton | Apr. 25, 1950 |